US011254198B2

(12) United States Patent
Takeda et al.

(10) Patent No.: US 11,254,198 B2
(45) Date of Patent: Feb. 22, 2022

(54) AUTOMOBILE DOOR SEALING MEMBER

(71) Applicants: Nishikawa Rubber Co., Ltd., Hiroshima (JP); MAZDA MOTOR CORPORATION, Hiroshima (JP)

(72) Inventors: Kazuyuki Takeda, Hiroshima (JP); Tatsuya Nagai, Hiroshima (JP); Manabu Ikegami, Aki-gun (JP); Masahiro Nakashige, Iwakuni (JP)

(73) Assignees: Nishikawa Rubber Co., Ltd., Hiroshima (JP); MAZDA MOTOR CORPORATION, Hiroshima (JP)

( * ) Notice: Subject to any disclaimer, the term of this patent is extended or adjusted under 35 U.S.C. 154(b) by 191 days.

(21) Appl. No.: 16/658,039

(22) Filed: Oct. 19, 2019

(65) Prior Publication Data

US 2020/0130489 A1 Apr. 30, 2020

(30) Foreign Application Priority Data

Oct. 29, 2018 (JP) .............................. JP2018-203162

(51) Int. Cl.
    *E06B 7/16*         (2006.01)
    *B60J 10/76*       (2016.01)
    *B60J 10/15*       (2016.01)

(52) U.S. Cl.
    CPC .............. *B60J 10/76* (2016.02); *B60J 10/15* (2016.02)

(58) Field of Classification Search
    CPC ... B60J 10/76; B60J 10/15; B60J 10/78; B60J 10/86; B60J 10/88
    USPC ....................................................... 49/479.1
    See application file for complete search history.

(56) References Cited

U.S. PATENT DOCUMENTS

| | | | | |
|---|---|---|---|---|
| 7,533,495 | B2* | 5/2009 | Teramoto | B60J 10/30 49/441 |
| 8,157,270 | B2* | 4/2012 | Tsou | F02K 1/805 277/644 |
| 8,464,472 | B2* | 6/2013 | Araki | F16J 15/061 49/492.1 |
| 8,479,449 | B2* | 7/2013 | Titz | B60J 10/78 49/440 |
| 8,667,738 | B2* | 3/2014 | Kondo | B60J 10/36 49/479.1 |
| 9,708,846 | B2* | 7/2017 | Masumoto | B60J 10/84 |

(Continued)

FOREIGN PATENT DOCUMENTS

| | | |
|---|---|---|
| JP | 3755080 B2 | 1/2006 |
| JP | 6065798 B2 | 1/2017 |

*Primary Examiner* — Jerry E Redman
(74) *Attorney, Agent, or Firm* — Renner, Otto, Roisselle & Sklar, LLP

(57) ABSTRACT

If a sealing member is mounted to a planar sealing member-mount extending from a window frame toward outside of the cabin, separation of a terminal portion of the sealing member from the window frame is to be reduced. A fixing member made of a hard material is provided on a terminal portion of the sealing member in a front-rear direction of a vehicle. The fixing member has a body portion, an engagement portion, and a fixing target portion. The body portion is fixed to the terminal portion of the sealing member. The engagement portion holds the planar sealing member-mount in a thickness direction. The fixing target portion is fixed to a portion of the window frame remote from the planar sealing member-mount in the front-rear direction of the vehicle.

6 Claims, 12 Drawing Sheets

(56) References Cited

U.S. PATENT DOCUMENTS

| | | | | |
|---|---|---|---|---|
| 9,845,001 | B1* | 12/2017 | Kojima | B60J 10/76 |
| 10,864,809 | B2* | 12/2020 | Matsuura | B60R 13/04 |
| 2002/0139054 | A1* | 10/2002 | Schlachter | B60J 10/30 |
| | | | | 49/479.1 |
| 2004/0177562 | A1* | 9/2004 | Deguchi | B60J 10/21 |
| | | | | 49/479.1 |
| 2004/0216384 | A1* | 11/2004 | Teramoto | B60J 10/80 |
| | | | | 49/479.1 |
| 2006/0162256 | A1* | 7/2006 | Tsuchida | B60J 10/79 |
| | | | | 49/479.1 |
| 2014/0059940 | A1* | 3/2014 | Eguchi | B60J 10/248 |
| | | | | 49/479.1 |
| 2016/0368356 | A1* | 12/2016 | Amagai | B60J 10/25 |
| 2017/0274750 | A1* | 9/2017 | Sobue | B60J 10/36 |
| 2018/0339582 | A1* | 11/2018 | Taketomo | B60J 10/30 |
| 2019/0031004 | A1* | 1/2019 | Kanphade | B60J 10/86 |
| 2020/0079298 | A1* | 3/2020 | Takeda | B60J 10/21 |
| 2020/0114744 | A1* | 4/2020 | Matsuura | B60J 10/36 |
| 2020/0122558 | A1* | 4/2020 | Seong | B60J 10/76 |

* cited by examiner

AUTOMOBILE DOOR SEALING MEMBER

CROSS-REFERENCE TO RELATED APPLICATION

This application claims priority to Japanese Patent Application No. 2018-203162 filed on Oct. 29, 2018, the entire disclosure of which is incorporated by reference herein.

BACKGROUND

The present disclosure relates to a sealing member provided for an automobile door.

Conventionally, an automobile door has been provided with a sealing member for sealing a gap between the door and the periphery of an opening of a vehicle body (see, for example, Japanese Patent No. 3755080 and Japanese Patent No. 6065798). A sealing member of Japanese Patent No. 3755080 has an extrusion-molded portion and a molded portion that is molded by using a molding die. The molded portion has a corner piece being in elastic contact with the joint between an upper portion of a center pillar of the vehicle body and a roof. The corner piece is mounted to a window frame of the door. A fixing plate is used to fix the molded portion to the window frame. The fixing plate includes a resin plate body and two clip strips protruding from a side surface of the plate body outside the vehicle. The plate body is assembled to the molded portion. In this state, the clip strips are respectively inserted into, and run through, insertion holes of the molded portion, and are respectively inserted into, and run through, engagement holes of the window frame so as to be engaged with the peripheries of the engagement holes. This allows the molded portion to be immovably assembled to a sash.

According to Japanese Patent No. 6065798, a planar sealing member-mount extending toward the outside of the cabin, on which the sealing member is mounted, is provided for an upper portion of the window frame. The sealing member is mounted to the planar sealing member-mount from the outside of the cabin. Such a sealing member configured to be mounted to the window frame from outside of the cabin as described in Japanese Patent No. 6065798 is called a "hiding type" sealing member partially covering the window frame from the outside of the cabin. This sealing member may sometimes be adopted due to, e.g., design requirements of a vehicle.

In Japanese Patent No. 6065798, a protruding portion of the sealing member is integrated with a corner portion of an upper end portion of the sealing member, and is fixed to the window frame by a mounting member.

SUMMARY

It is not recommended that a terminal portion of the sealing member fixed to the window frame be separated from the window frame. The reason for this is that, in this situation, a narrower portion of the gap between the sealing member and the vehicle body may degrade appearance, and may cause the sealing member to rattle when the terminal portion and its vicinity of the sealing member is pressed from the outside of the vehicle.

To address this problem, for example, clips of a fixing plate similar to those disclosed in Japanese Patent No. 3755080 may be used to fix the terminal portion to the window frame. However, to reduce rattling, two clips are required as disclosed in Japanese Patent No. 3755080. Thus, a need arises to allow the window frame to have two engagement holes in which the clips are respectively to be engaged.

However, since a planar sealing member-mount of a hiding type sealing member similar to that disclosed in Japanese Patent No. 6065798 extends from the window frame toward the outside of the cabin, it becomes difficult for the window frame to have a space for forming two engagement holes. In particular, in recent years, if the window frame is thin in response to the design requirements, this difficulty causes a significant problem.

In addition, in Japanese Patent No. 6065798, the protruding portion is fixed, as a structure that fixes the hiding type sealing member, to the window frame by the mounting member. However, since this example is directed to the hiding type sealing member, the window frame can have only one engagement hole as can be seen from the foregoing description. Thus, the terminal portion of the sealing member may be separated from the window frame.

In view of the foregoing background, it is therefore an object of the present disclosure to, if a sealing member is mounted to a planar sealing member-mount extending from a window frame toward outside of the cabin, reduce separation of a terminal portion of the sealing member from the window frame.

To achieve the foregoing object, a first aspect of the present disclosure is directed to a sealing member for an automobile door configured to be mounted to a planar sealing member-mount extending toward outside of a cabin from an upper portion of a window frame, and to seal a gap between the window frame and a window glass. The upper portion extends to define a window opening of the automobile door. A fixing member is provided on a terminal portion of the sealing member in a longitudinal direction of a vehicle, and is made of a material harder than a molded portion forming part of the terminal portion. The fixing member has a body portion, an engagement portion, and a fixing target portion. The body portion is fixed to the terminal portion of the sealing member. The engagement portion holds the planar sealing member-mount in a thickness direction to engage with the planar sealing member-mount. The fixing target portion is fixed to a portion of the window frame remote from the planar sealing member-mount in the longitudinal direction of the vehicle.

According to this configuration, the terminal portion of the sealing member is fixed to the window frame through the fixing member. At this time, the engagement portion of the fixing member holds the planar sealing member-mount of the window frame in the thickness direction, and the fixing target portion is fixed to the portion of the window frame remote from the planar sealing member-mount in the front-rear direction of the vehicle. That is to say, since portions of the fixing member separated from each other are fixed to the window frame, the fixing member is stabilized, and is less likely to rattle. This can reduce separation of the terminal portion of the sealing member from the window frame.

The planar sealing member-mount extending toward the outside of the cabin is used to fix the engagement portion of the fixing member. Thus, only a small space for the window frame is required to fix the fixing member. The hiding type sealing member can also reduce separation of the terminal portion of the sealing member from the window frame.

In a second aspect of the present disclosure, the terminal portion of the sealing member may have a molded portion molded by using an openable molding die, the molded portion of the terminal portion of the sealing member may be connected to an extrusion-molded portion that is extrusion-molded together with a core material, and the fixing member may have an extension portion extended to, and supported by, the extrusion-molded portion.

According to this configuration, since the extension portion of the fixing member mounted to the sealing member is supported by the core material of the extrusion-molded portion, the fixing member is further stabilized.

In a third aspect of the present disclosure, the extension portion may have an abutting plate portion configured to abut against the planar sealing member-mount from above.

According to this configuration, since the abutting plate portion of the extension portion of the fixing member abuts against the planar sealing member-mount with the sealing member mounted to the window frame, the fixing member is further stabilized.

In a fourth aspect of the present disclosure, the extension portion may have an end surface abutting portion configured to abut against an end surface of the planar sealing member-mount near outside of the cabin.

According to this configuration, the end surface abutting portion of the fixing member abuts against the end surface of the planar sealing member-mount near the outside of the cabin with the sealing member mounted to the window frame. Thus, the fixing member is positioned in the inside-to-outside direction of the cabin.

In a fifth aspect of the present disclosure, the engagement portion may have an upper abutting portion and a lower abutting portion. The upper abutting portion protrudes from the body portion toward inside of the cabin, and is configured to abut against the planar sealing member-mount from above. The lower abutting portion protrudes from the body portion toward the inside of the cabin, and is configured to abut against the planar sealing member-mount from below.

According to this configuration, since, while the sealing member is mounted to the window frame, the upper abutting portion of the fixing member abuts against the planar sealing member-mount from above, and the lower abutting portion abuts against the planar sealing member-mount from below, the fixing member is less likely to rattle in the up-down direction.

In a sixth aspect of the present disclosure, a front end portion of at least one of the upper and lower abutting portions in a protruding direction may be provided with a guide configured to guide the planar sealing member-mount between the upper and lower abutting portions.

According to this configuration, when the planar sealing member-mount is to be inserted between the upper and lower abutting portions during assembly of the sealing member, the planar sealing member-mount is guided relatively into a space between the upper and lower abutting portions by the guide.

According to the first aspect of the present disclosure, a fixing member is provided on a terminal portion of a sealing member, and has an engagement portion and a fixing target portion. The engagement portion holds a planar sealing member-mount in a thickness direction. The fixing target portion is fixed to a portion of a window frame remote from the planar sealing member-mount. Thus, the fixing member can be stabilized. Thus, if the sealing member is mounted to the planar sealing member-mount, separation of the terminal portion of the sealing member from the window frame can be reduced.

According to the second aspect of the present disclosure, since an extension portion of the fixing member is supported by a core material of an extrusion-molded portion, the fixing member is further stabilized. This can reduce rattling of the terminal portion of the sealing member.

According to the third aspect of the present disclosure, since an abutting plate portion of the extension portion abuts against the planar sealing member-mount from above, the fixing member is further stabilized. This can reduce rattling of the terminal portion of the sealing member.

According to the fourth aspect of the present disclosure, an end surface abutting portion of the extension portion abutting against an end surface of the planar sealing member-mount near the outside of the cabin allows the fixing member to be positioned in the inside-to-outside direction of the cabin. This allows the terminal portion of the sealing member to be assembled at a predetermined position.

According to the fifth aspect of the present disclosure, since the fixing member has an upper abutting portion abutting against the planar sealing member-mount from above, and a lower abutting portion abutting against the planar sealing member-mount from below, the fixing member is less likely to rattle in the up-down direction. This can reduce rattling of the terminal portion of the sealing member.

According to the sixth aspect of the present disclosure, since the planar sealing member-mount is guided between the upper and lower abutting portions, the sealing member can be more easily assembled.

DETAILED DESCRIPTION

Embodiments of the present disclosure will be described in detail with reference to the drawings. The following description of advantageous embodiments is only an example in nature, and is not intended to limit the scope, applications, or use of the present disclosure.

Figure 1:
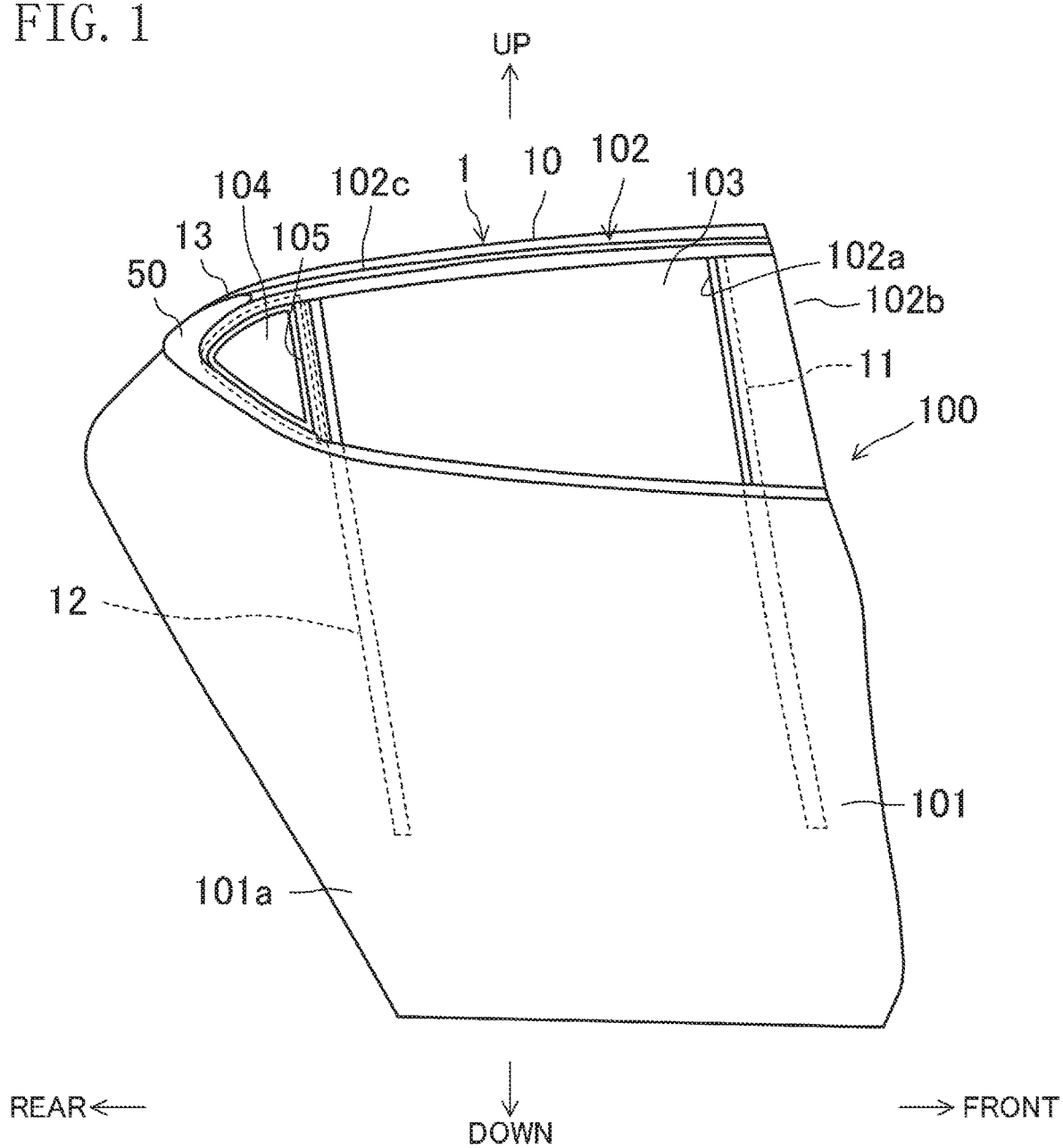
FIG. 1 is a side view of a right automobile door including an automobile door sealing member according to an embodiment of the present disclosure, as viewed from outside a cabin.

FIG. 1 illustrates an automobile door 100 including an automobile door sealing member according to an embodiment of the present disclosure. The automobile door 100 illustrated in FIG. 1 is used to open and close an opening (not shown) formed through a vehicle body and allowing a passenger to get on and off the vehicle, and is a right rear door arranged on the right side of a rear portion of the automobile. FIG. 1 is a view of the automobile door 100 as viewed from outside the cabin. A situation where the automobile door 100 to which the present disclosure has been applied is a right rear door will be used to describe this embodiment. However, this situation is merely an example of the present disclosure. The present disclosure is applicable to a left rear door and right and left front doors provided for a front portion of an automobile.

In the following description of this embodiment, the front, rear, right, and left sides of the vehicle will be simply referred to as the "front," "rear," "right," and "left," respectively.

Configuration of Automobile Door 100

The automobile door 100 includes a door body 101, a window frame 102, a window glass 103 held by the window frame 102, and a fixed glass panel 104. The door body 101 includes therein a space through which the window glass 103 is moved down and a space in which a window regulator (not shown) allowing the window glass 103 to move up and down is disposed.

The window frame 102 extends upward from the door body 101, and is frame-shaped to define a window opening 102a together with the upper edge of the door body 102, and is also referred to as a sash. A rear fixed glass sealing member 105 formed in the shape of a substantially triangular frame is mounted to the rear side of the window frame 102 so as to be positioned within the window opening 102a. The window glass 103 is moved up to close a portion of the window opening 102a on the front side of the rear fixed glass sealing member 105, and is moved down to open this portion. On the other hand, the fixed glass panel 104 is fixed inside the rear fixed glass sealing member 105, and blocks a portion of the window opening 102a that is extending rearward beyond the window glass 103.

Figure 12:
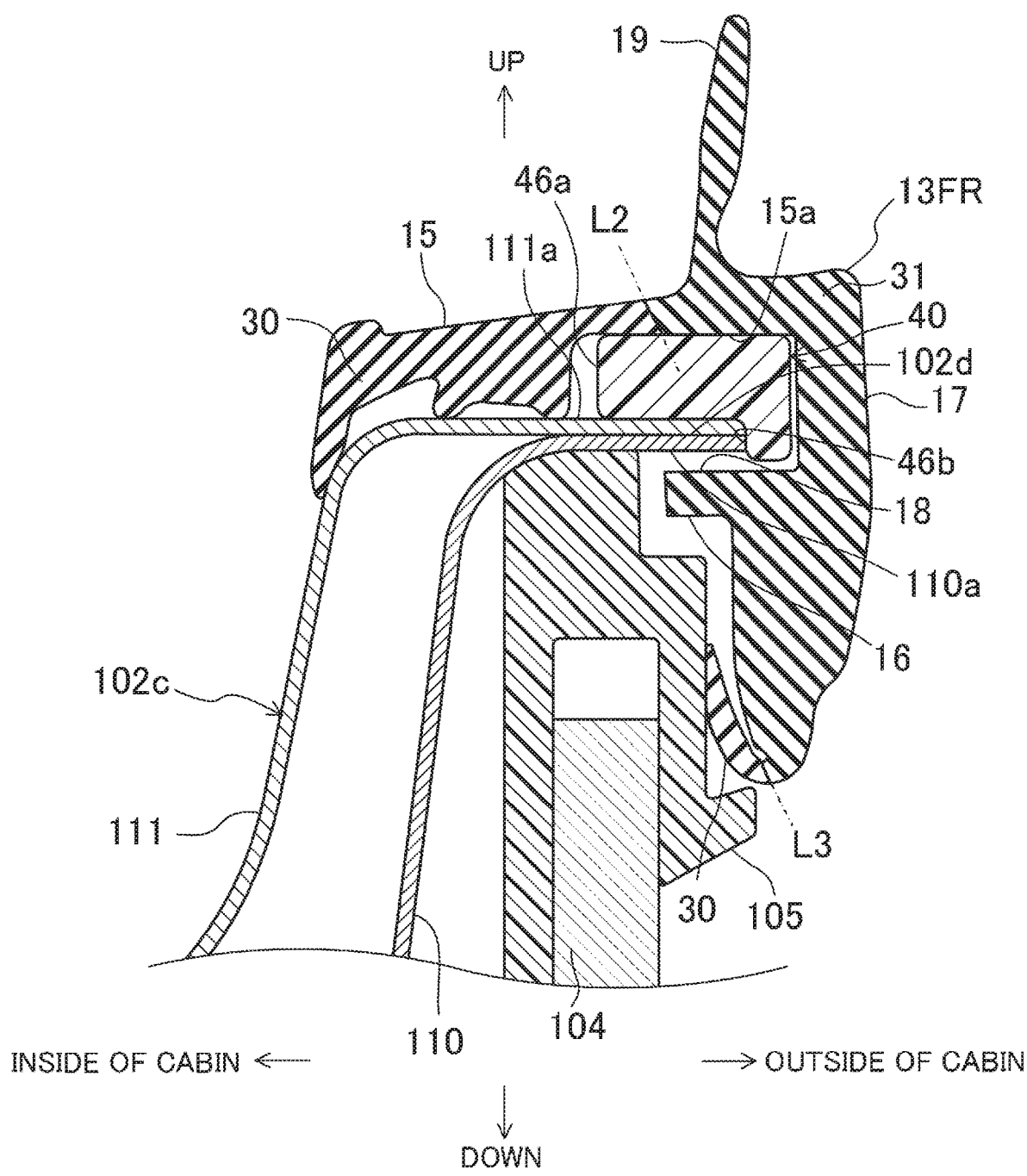
FIG. 12 is a cross-sectional view taken along line XII-XII shown in FIG. 3.

The window frame 102 includes a front frame portion 102b extending upward from a front portion of an upper end portion of the door body 101, and an upper frame portion 102c extending rearward and gently downward from an upper end of the front frame portion 102b to a rear portion of the upper end portion of the door body 101. As illustrated in FIG. 12, the window frame 102 is comprised of a combination of an outer panel 110 which is an exterior face of the window frame 102 toward the outside of the cabin, and an inner panel 111 which is an interior face of the window frame 102 toward the inside of the cabin. An upper portion 110a of the outer panel 110 extends toward the outside of the cabin and in the front-rear direction. An upper portion 111a of the inner panel 111 also extends toward the outside of the cabin and in the front-rear direction. The upper portion 110a of the outer panel 110 is bonded to the lower surface of the upper portion 111a of the inner panel 111. Thus, as illustrated also in FIG. 5, the upper frame portion 102c of the window frame 102 includes a planar sealing member-mount 102d protruding toward the outside of the cabin. The upper portion 111a of the inner panel 111 is provided with a raised portion 111b. The raised portion 111b is formed by partially cutting, and raising, the upper portion 111a of the inner panel 111, and protrudes upward.

Figure 10:
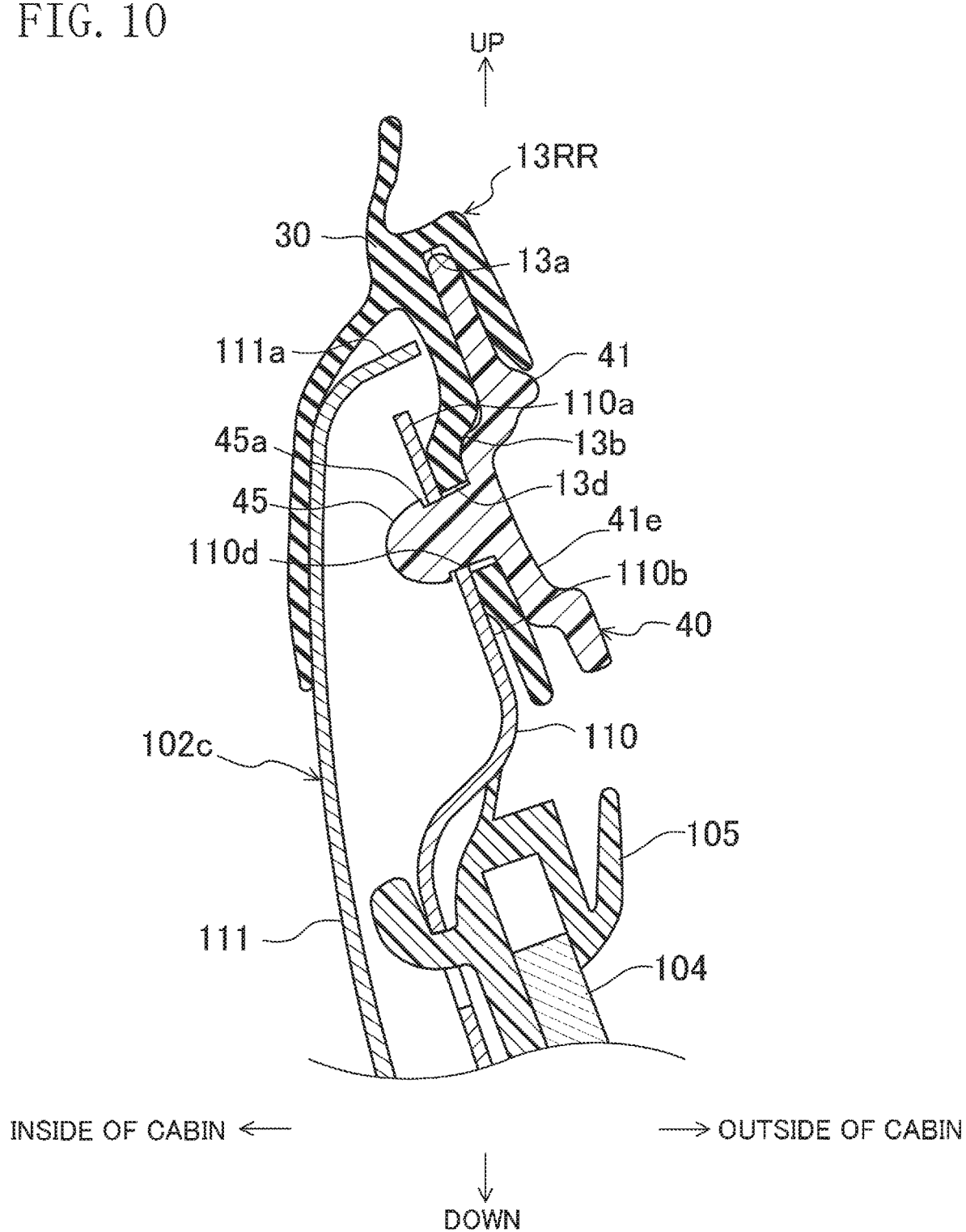
FIG. 10 is a cross-sectional view taken along line X-X shown in FIG. 3.

As can be seen from a comparison between FIG. 10 (a cross-sectional view taken along line X-X in FIG. 3) and FIG. 12 (a cross-sectional view taken along line XII-XII in FIG. 3), the dimension of the upper frame portion 102c of the window frame 102 in the inside-to-outside direction of the cabin decreases toward the rear end of the upper frame portion 102c. Such a dimension is adopted due to the design requirements of the vehicle. This configuration causes a portion of the upper portion 110a of the outer panel 110 included in a rear portion of the upper frame portion 102c to be formed only in a plane extending in the up-down direction as illustrated in FIG. 10. The formation of this planar portion 110b prevents a planar sealing member-mount extending toward the outside of the cabin from being formed.

Figure 5:
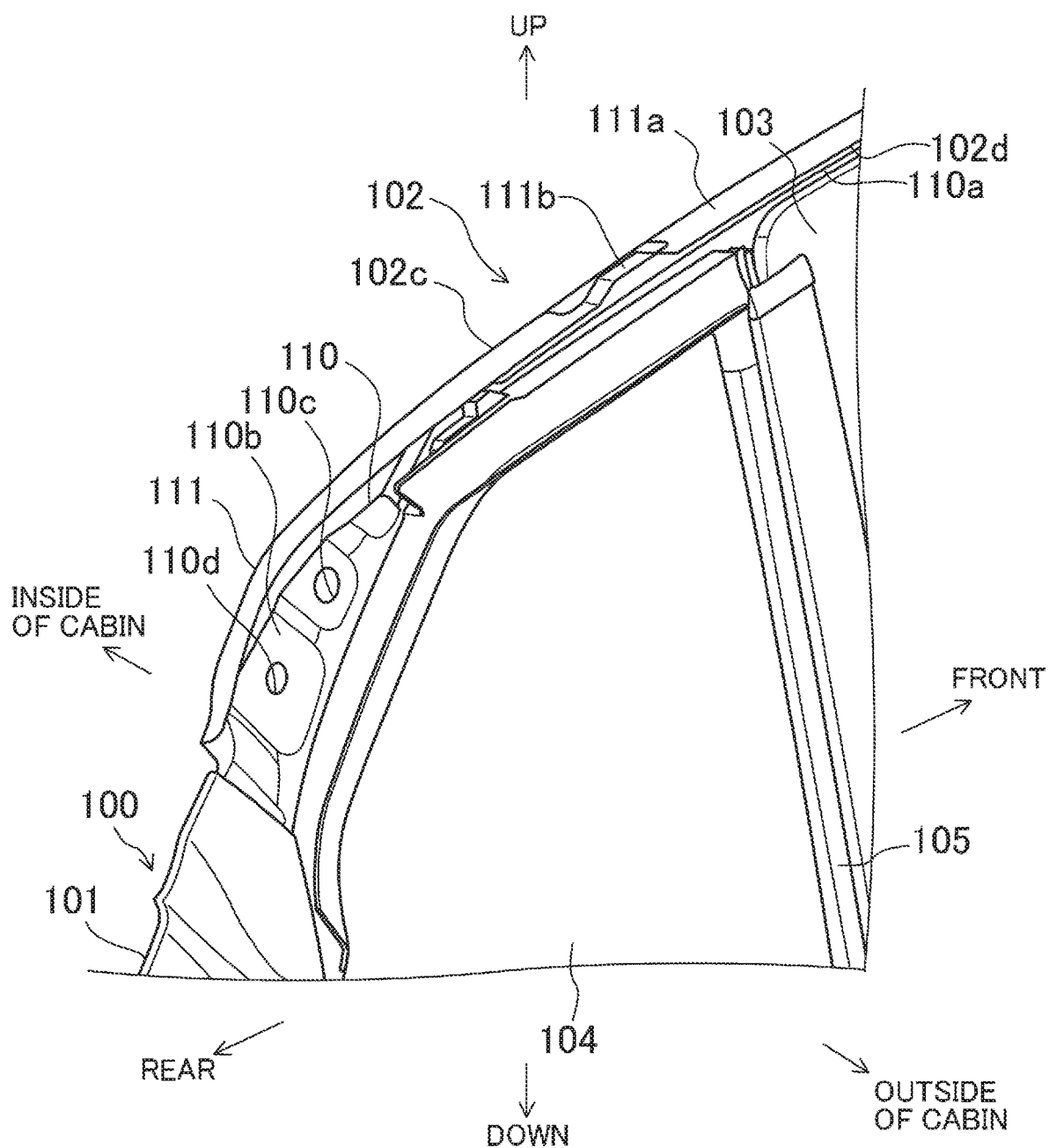
FIG. 5 is a perspective view of the rear portion of the right automobile door from which a garnish and the glass run are removed and its surrounding area, as viewed from outside the cabin.

As can be seen from a comparison between FIGS. 10 and 12, the dimension of the upper frame portion 102c of the window frame 102 in the up-down direction increases toward the rear end of the upper frame portion 102c. This dimension is also adopted due to the design requirements of the vehicle. Thus, as described above, the rear portion of the upper frame portion 102c includes the planar portion 110b illustrated in FIG. 10. The planar portion 110b has a front mounting hole 110c and a rear mounting hole 110d spaced apart from each other in the front-rear direction as illustrated in FIG. 5. The rear mounting hole 110d is positioned below the front mounting hole 110c.

Configuration of Glass Run 1

As illustrated in FIG. 1, the automobile door 100 is provided with a glass run (automobile door sealing member) 1 for sealing a gap between the window frame 102 and the window glass 103. The glass run 1 includes an upper glass run portion 10, a front glass run portion 11, a rear glass run portion 12, and a rear glass run terminal portion 13 protruding rearward from the upper end of the rear glass run portion 12, and is configured to seal the gap between the window frame 102 and the window glass 103.

The upper glass run portion 10 extends in the front-rear direction along the upper frame portion 102c of the window frame 102. The front glass run portion 11 extends downward from a front portion of the upper glass run portion 10 to the inside of the door body 101 along the upper frame portion 102b of the window frame 102. The rear glass run portion 12 is positioned in front of the fixed glass panel 104, and extends downward from a rear portion of the upper glass run portion 10 to the inside of the door body 101 along the front edge of the fixed glass panel 104. The window glass 103 is designed to move up and down between the front glass run portion 11 and the rear glass run portion 12, and has front and rear edge portions respectively held by the front glass run portion 11 and the rear glass run portion 12.

The upper glass run portion 10 has a cross-sectional shape similar to that of a front portion 13FR of the rear glass run terminal portion 13 shown in FIG. 12, and includes an upper wall portion 15 arranged above the planar sealing member-mount 102d, a lower wall portion 16 arranged below the planar sealing member-mount 102d, and an outer vertical wall portion 17 extending from an end of the upper wall portion 15 near the outside of the cabin to an end of the lower wall portion 16 near the outside of the cabin. A mounting groove 18 that opens toward the inside of the cabin is formed on a portion of the upper glass run portion 10 between the upper and lower wall portions 15 and 16. To mount the upper glass run portion 10 to the upper frame portion 102c, the upper glass run portion 10 needs to be disposed on a portion of the planar sealing member-mount 102d outside the cabin, and the planar sealing member-mount 102d needs to be inserted into the mounting groove 18. The upper glass run portion 10 is mounted to the planar sealing member-mount 102d from outside the cabin.

The upper wall portion 15 of the upper glass run portion 10 is provided with an upper sealing lip portion 19 protruding upward and extending in the front-rear direction. While the automobile door 100 is closed, the upper sealing lip portion 19 comes into contact with a vehicle body panel (not shown) so as to be elastically deformed. This allows the sealing member to have adequate sealing performance. The outer vertical wall portion 17 of the upper glass run portion 10 protrudes downward beyond the lower wall portion 16. An outer surface of the outer vertical wall portion 17 facing outside the cabin forms a design surface.

Figure 3:
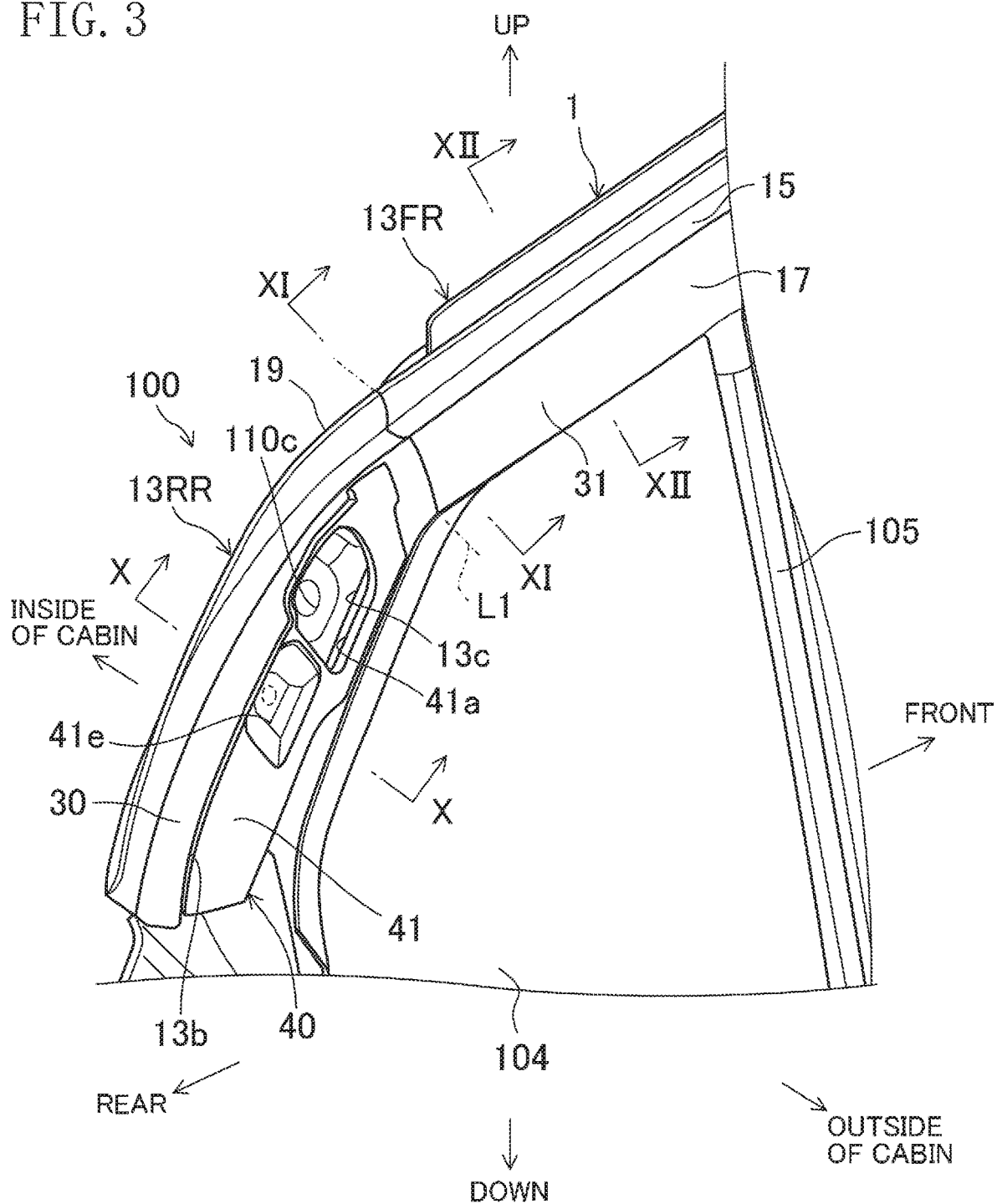
FIG. 3 is a perspective view of the rear portion of the right automobile door from which a garnish is removed and its surrounding area, as viewed from outside the cabin.

The cross-sectional shape of the front portion 13FR of the rear glass run terminal portion 13 shown in FIG. 12 is generally obtained by removing an inner planar seal portion 24, a first inner seal lip 24a, a second inner seal lip 24b, and an inner decorative lip 22, which are unnecessary, from a cross-sectional shape similar to that shown in FIG. 3 of Japanese Patent Publication No. 2017-226239.

Although neither shown nor described in detail, the extruded cross-sectional shape of the upper glass run portion 10 of the present disclosure is similar to the cross-sectional shape shown in FIG. 3 of Japanese Patent Publication No. 2017-226239. The upper glass run portion 10 is mounted to a window frame of an automobile door similar to the window frame shown in FIG. 2 of Japanese Patent Publication No. 2017-226239.

A decorative trim strip (not shown) made of metal or any other material may be mounted to an outer surface of the outer vertical wall portion 17 outside the cabin.

The rear glass run terminal portion 13 extends to the vicinity of the rear end of the upper frame portion 102c of the window frame 102. A boundary line L1 indicated by the dot-and-dash line shown in FIG. 4 indicates the boundary between a molded portion 30 and an extrusion-molded portion 31. The molded portion 30 is molded by using an openable molding die (not shown), and has different cross sections in the longitudinal direction thereof. Examples of the material of the molded portion 30 include a rubber and an elastomer. The extrusion-molded portion 31 is obtained by extruding a material through using a known extrusion die or any other suitable tool, and has the same cross section in the longitudinal direction thereof. To obtain the extrusion-molded portion 31, the extrusion-molded portion 31 is extruded together with a core material made of a hard resin or any other suitable material although not shown. A portion of the extrusion-molded portion 31 except the core material is made of a material similar to that of the molded portion 30. After the extrusion-molded portion 31 is molded, a rear end portion of the extrusion-molded portion 31 is placed in the cavity of the molding die. Then, a material is supplied into the cavity so as to be molded. This allows the molded portion 30 to be molded and to be connected to, and integrated with, the extrusion-molded portion 31.

Figure 11:
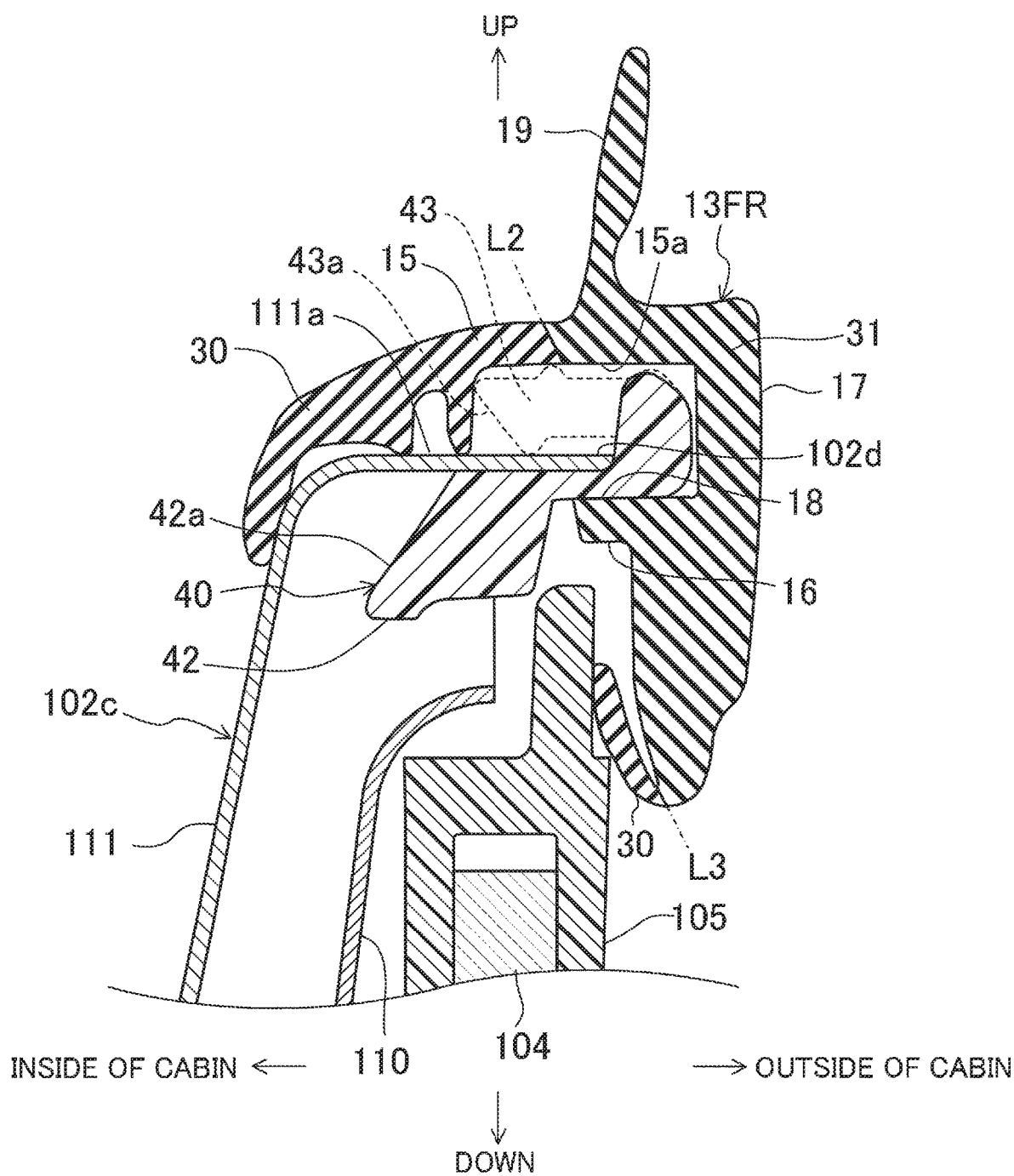
FIG. 11 is a cross-sectional view taken along line XI-XI shown in FIG. 3.

Boundary lines L2 and L3 shown in FIGS. 11 and 12 indicate the boundary between the molded portion 30 and the extrusion-molded portion 31. A portion of the automobile door sealing member closer to the outside of the cabin than the boundary line L2 is the extrusion-molded portion 31, and a portion thereof closer to the inside of the cabin than the boundary line L2 is the molded portion 30. A portion of the automobile door sealing member closer to the outside of the cabin than the boundary line L3 is the extrusion-molded portion 31, and a portion thereof closer to the inside of the cabin than the boundary line L3 is the molded portion 30.

Thus, the front portion 13FR of the rear glass run terminal portion 13 includes the molded portion 30 and the extrusion-molded portion 31. On the other hand, as illustrated in FIG. 10, the entirety of a rear portion 13RR of the rear glass run terminal portion 13 corresponds to the molded portion 30.

As illustrated in FIGS. 11 and 12, a lower surface of the upper wall portion 15 of the front portion 13FR of the rear glass run terminal portion 13 has a recess 15a recessed upward. The recess 15a extends in the front-rear direction. As illustrated in FIG. 10, the rear portion 13RR of the rear glass run terminal portion 13 has an insertion groove 13a into which a fixing member 40 described below is to be inserted. The insertion groove 13a also extends in the front-rear direction.

Figure 4:
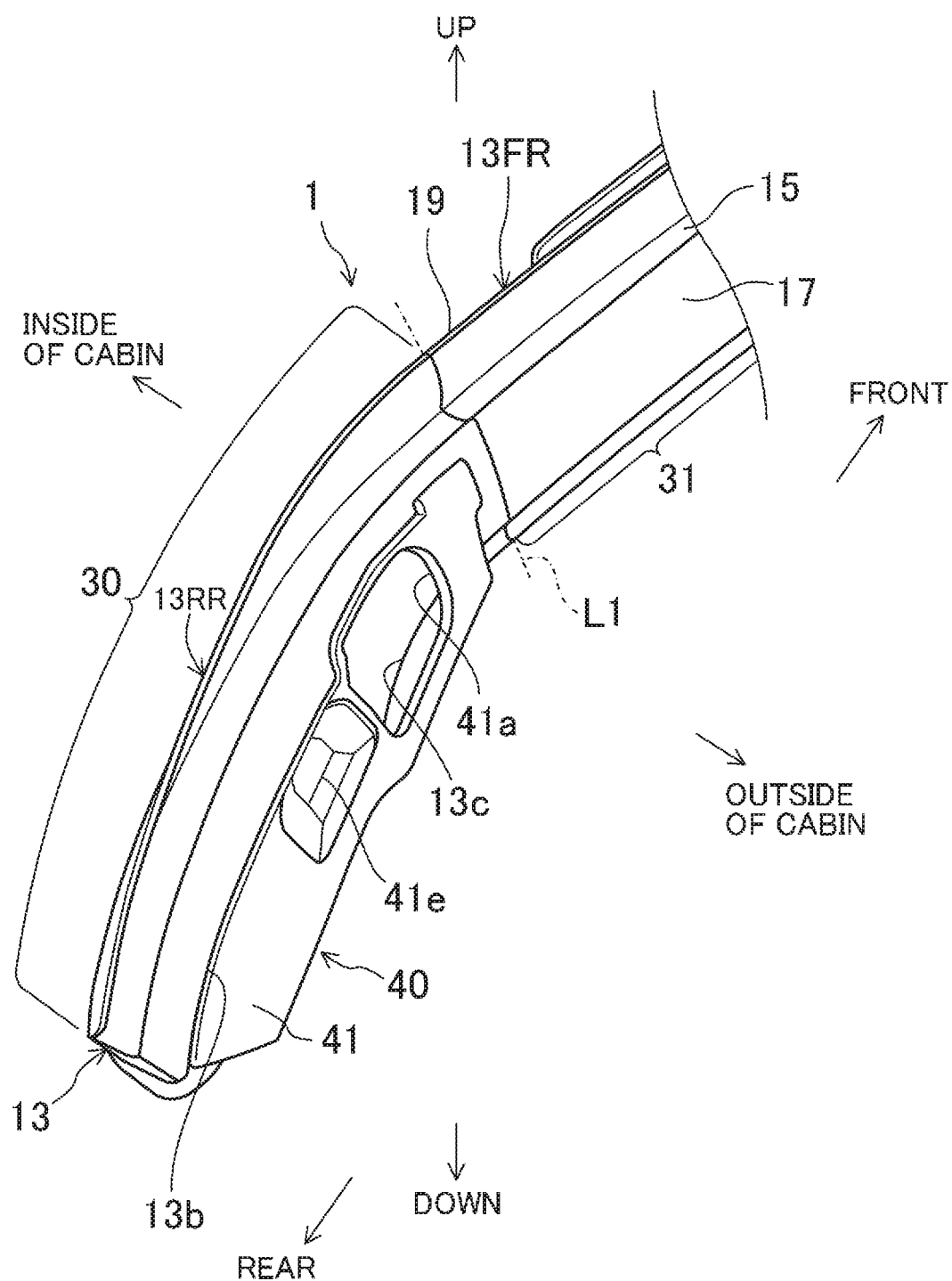
FIG. 4 is a perspective view of a rear portion of a right glass run, as viewed from outside the cabin.

As illustrated in FIG. 4 and any other figure, a portion of the rear portion 13RR of the rear glass run terminal portion 13 outside the cabin has a fitting recess 13b into which the fixing member 40 is to be fitted. The rear portion 13RR of the rear glass run terminal portion 13 also has a through hole 13c passing therethrough in the inside-to-outside direction of the cabin.

Figure 6:
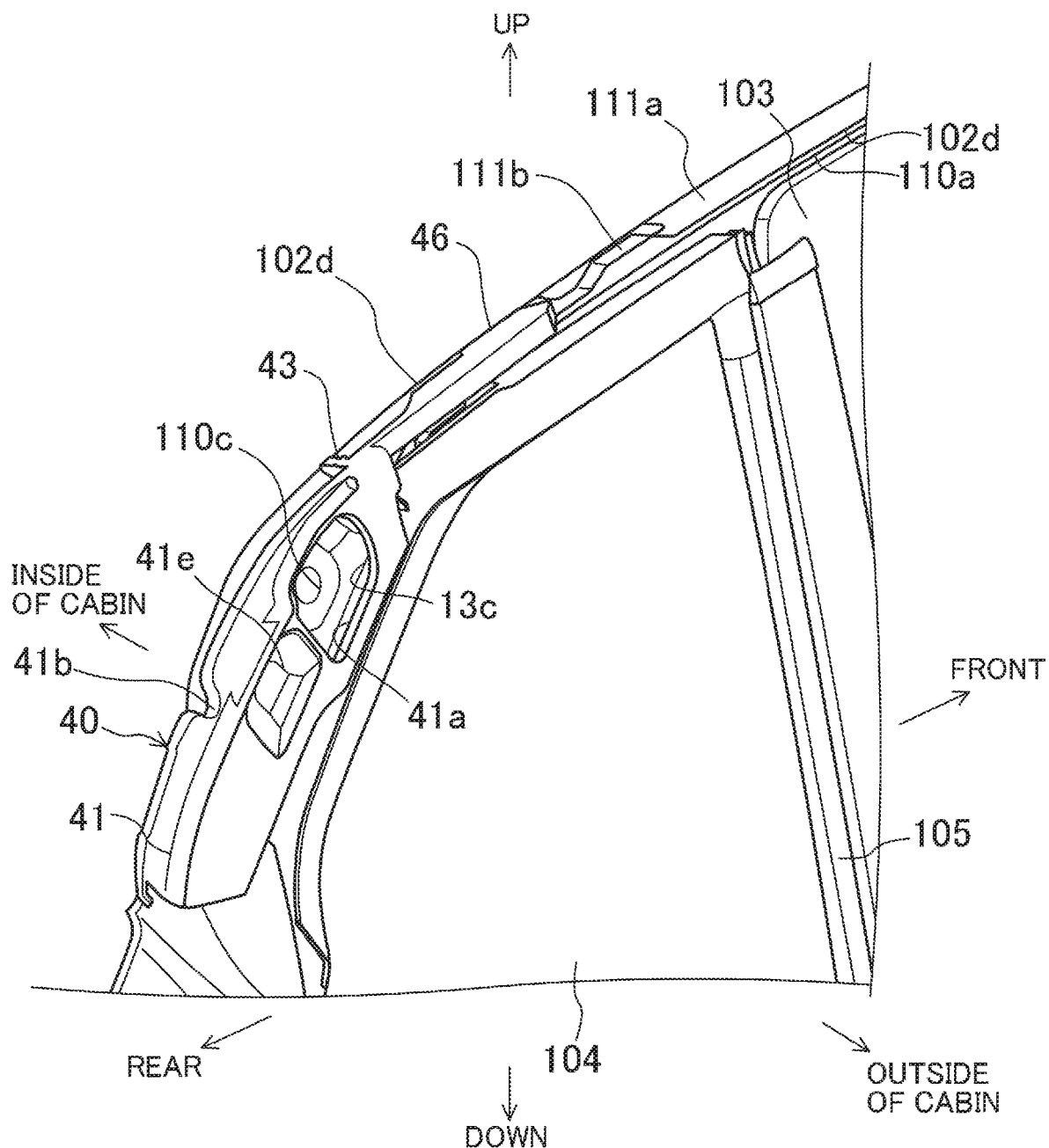
FIG. 6 is a view corresponding to FIG. 5 and illustrating the rear portion of the right automobile door from which the glass run is removed and to which a fixing member is mounted.

As illustrated in FIG. 6, the through hole 13c is aligned with the front mounting hole 110c of the upper frame portion 102c. As illustrated in FIG. 10, a portion of the rear glass run terminal portion 13 on the rear side of the through hole 13c has a fixing hole 13d passing therethrough in the inside-to-outside direction of the cabin.

Configuration of Fixing Member 40

The fixing member 40 forms part of the glass run 1, is provided on the rear glass run terminal portion 13, and is used to fix the rear glass run terminal portion 13 to the window frame 102 as illustrated in FIG. 3. The fixing member 40 is made of a material harder than a material forming the molded portion 30 of the rear glass run terminal portion 13, and can be made of a hard resin material, for example.

Figure 8:
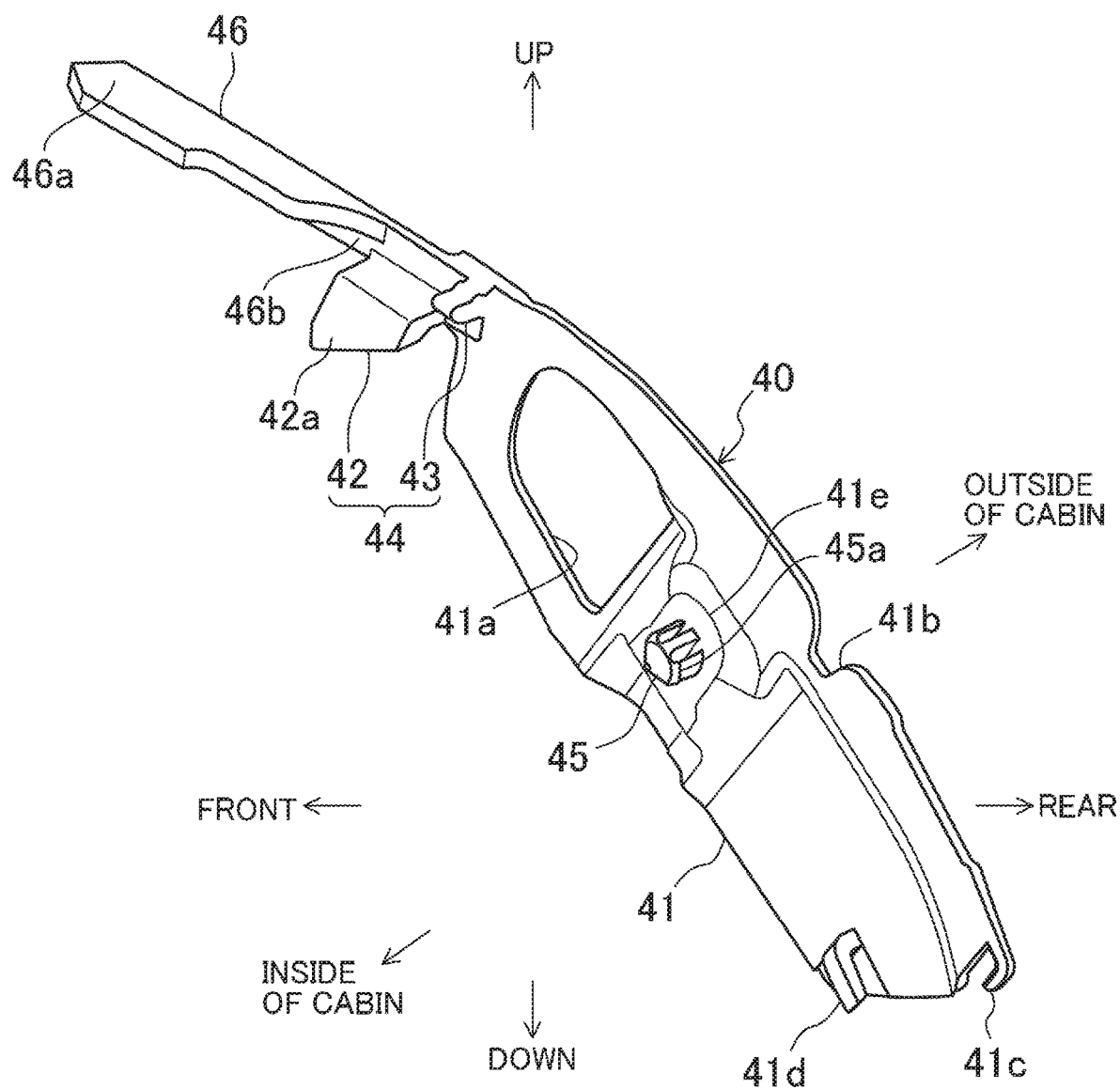
FIG. 8 is a perspective view of the right fixing member as viewed from inside the cabin.
Figure 9:
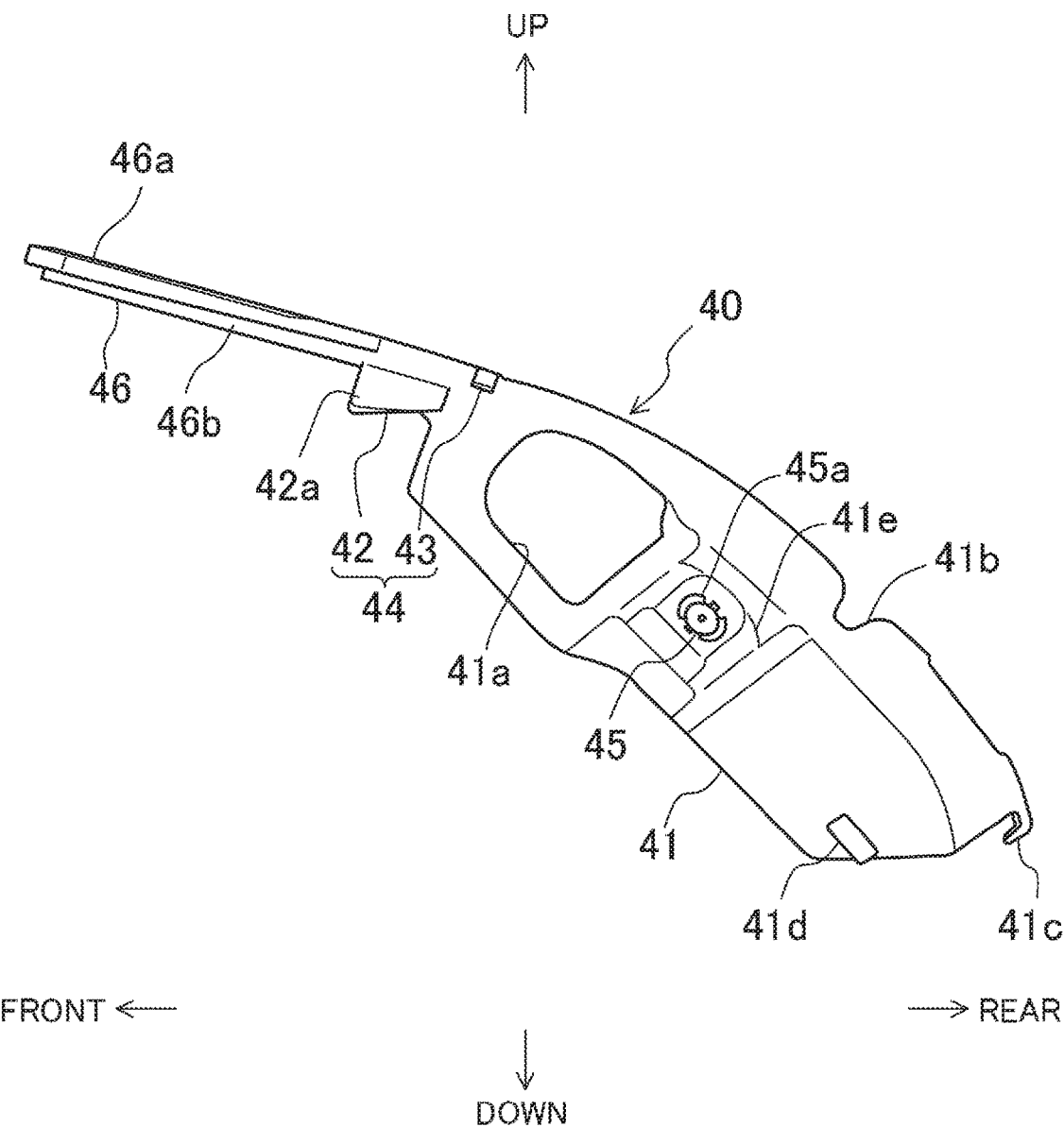
FIG. 9 is a side view of the right fixing member as viewed from inside the cabin.

As illustrated in FIGS. 8 and 9, the fixing member 40 includes a body portion 41, an engagement portion 44, a clip (a fixing target portion) 45, and an extension portion 46, which are integrated together. The body portion 41 is formed in the shape of a plate extending in the up-down direction and in the front-rear direction, and is fitted into, and fixed to, the fitting recess 13b formed on the surface of the rear glass run terminal portion 13 near the outside of the cabin from the outside of the cabin. The rear end of the body portion 41 extends to the rear end of the rear glass run terminal portion 13. This body portion 41 reduces the deformation of the rear portion 13RR of the rear glass run terminal portion 13.

The body portion 41 has an opening 41a. As illustrated in FIGS. 3 and 4, the position and size of the opening 41a are respectively determined to be substantially the same as those of a rear portion of the through hole 13c of the rear glass run terminal portion 13. Thus, as illustrated in FIG. 6, the front mounting hole 110c of the upper frame portion 102c is visible from the outside of the cabin through the through hole 13c of the rear glass run terminal portion 13 and the opening 41a of the fixing member 40. The front mounting hole 110c is a hole for mounting, and fixing, a garnish 50 to be described below (not shown).

As illustrated in FIG. 10, an upper edge portion of the body portion 41 is held by the rear portion 13RR of the rear glass run terminal portion 13 while being inserted into the insertion groove 13a of the rear glass run terminal portion 13 from below. As illustrated in FIGS. 8 and 9, the upper edge portion of the body portion 41 has a notch 41b formed on the rear side of the opening 41a. A positioning protrusion (not shown) formed inside the insertion groove 13a of the rear portion 13RR of the rear glass run terminal portion 13 is fitted into the notch 41b. Fitting the positioning protrusion into the notch 41b makes it difficult for the fixing member 40 to be misaligned with the rear portion 13RR of the rear glass run terminal portion 13 in the front-rear direction.

A rear end portion of the body portion 41 has an upper hook portion 41c and a lower hook portion 41d, which are spaced apart from each other in the up-down direction. The upper hook portion 41c is formed to open downward, and is adapted to engage with an upper hook engagement hole (not shown) of the rear portion 13RR of the rear glass run terminal portion 13. The lower hook portion 41d is formed to open rearward, and is adapted to engage with a lower hook engagement hole (not shown) of the rear portion 13RR of the rear glass run terminal portion 13. The upper and lower hook portions 41c and 41d engaging with the rear portion 13RR of the rear glass run terminal portion 13 makes it difficult for the fixing member 40 to rattle against the rear portion 13RR of the rear glass run terminal portion 13.

A cavity 41e is formed between the opening 41a of the body portion 41 and a pair of the upper and lower hook portions 41c and 41d, and is recessed toward the inside of the cabin. As illustrated also in FIG. 10, the cavity 41e is formed to correspond to the rear mounting hole 110d of the upper frame portion 102c, and is recessed to approach the rear mounting hole 110d. A surface of the cavity 41e near the inside of the cabin is provided with the clip 45 protruding toward the inside of the cabin. The clip 45 is inserted into, and run through, the fixing hole 13d of the rear glass run terminal portion 13 and the rear mounting hole 110d of the upper frame portion 102c, and also has a claw portion 45a engaging with the periphery of the rear mounting hole 110d from the inside of the cabin. The claw portion 45a engaging with the periphery of the rear mounting hole 110d of the upper frame portion 102c substantially prevents the clip 45 from being disengaged. This allows the fixing member 40 to be fixed to the upper frame portion 102c. Since the rear mounting hole 110d of the upper frame portion 102c is spaced rearward apart from the planar sealing member-mount 102d, the clip 45 is fixed to a portion of the window frame 102 remote from the planar sealing member-mount 102d in the front-rear direction of the vehicle.

Figure 7:
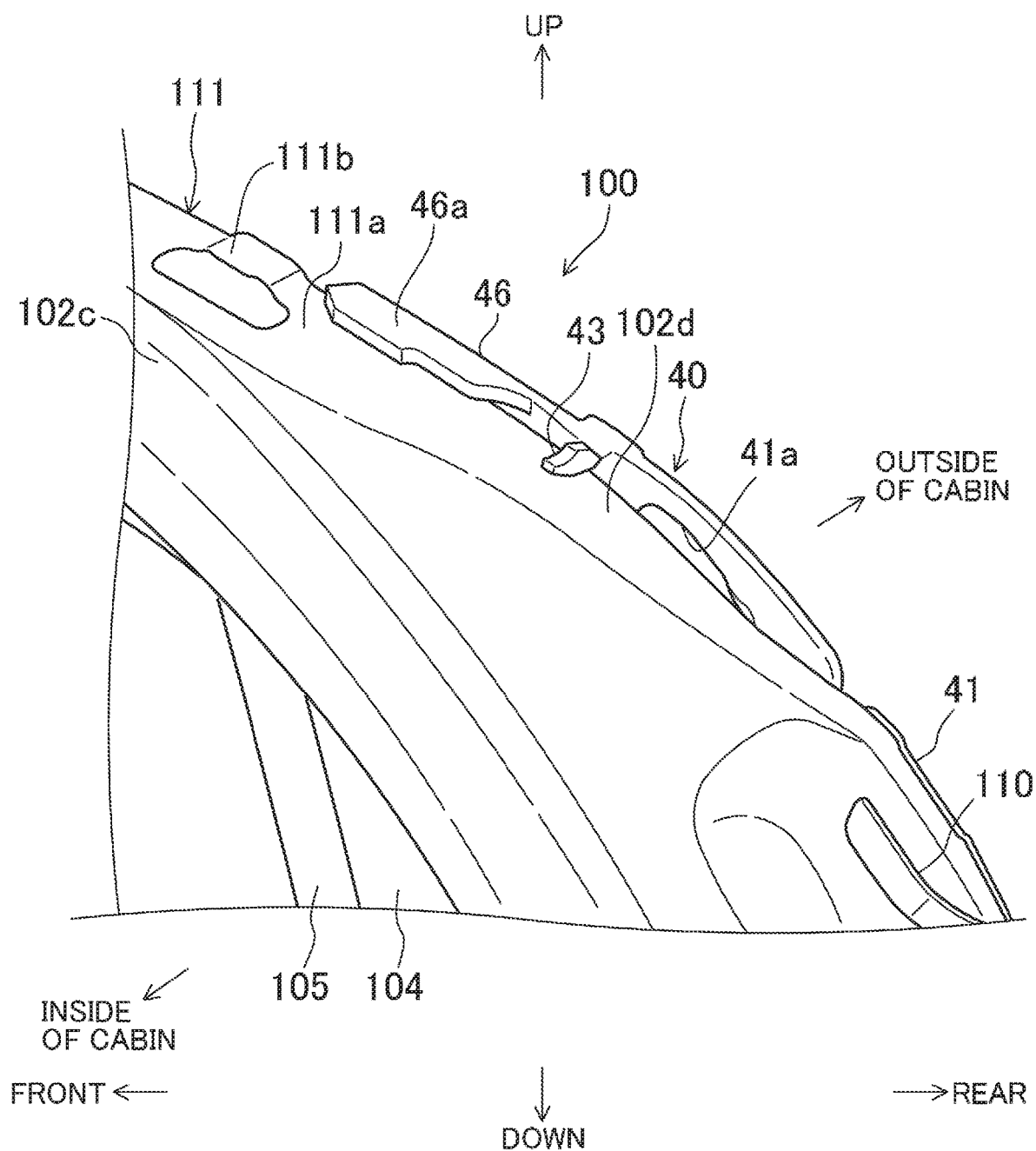
FIG. 7 is a perspective view of the rear portion of the right vehicle door from which the glass run is removed and to which the fixing member is mounted, and its surrounding area, as viewed from inside the cabin.

As illustrated in FIG. 8, the extension portion 46 is extended forward from the upper end of a front end portion of the body portion 41 to the extrusion-molded portion 31. As illustrated in FIGS. 8 and 11, the engagement portion 44 holds the planar sealing member-mount 102d in the thickness direction, and has a lower abutting portion 42 and an upper abutting portion 43. As illustrated in FIGS. 8 and 11, the lower abutting portion 42 protrudes from the vicinity of a basal end of the extension portion 46 toward the inside of the cabin, and abuts against the planar sealing member-mount 102d of the upper frame portion 102c from below. The upper abutting portion 43 protrudes from the vicinity of the upper end of the body portion 41 toward the inside of the cabin as illustrated in FIGS. 8 and 9, and abuts against the planar sealing member-mount 102d of the upper frame portion 102c from above as illustrated in FIGS. 7 and 11. As illustrated in FIGS. 8 and 11, the lower abutting portion 42 protrudes to be closer to the inside of the cabin than the upper abutting portion 43 does. The planar sealing member-mount 102d is sandwiched between the lower and upper abutting portions 42 and 43 in the thickness direction such that the engagement portion 44 engages with the planar sealing member-mount 102d.

An abutting plate portion 46a of the extension portion 46 and the upper abutting portion 43 are separated from each other as illustrated in FIGS. 7, 8, and 9, and the installation position of the upper abutting portion 43 is positioned rearward of the lower abutting portion 42. In FIG. 11, for ease of understanding of the position of the upper abutting portion 43, the upper abutting portion 43 is indicated by the virtual line (broken line). Although not shown, the abutting plate portion 46a and the upper abutting portion 43 may be continuous without being separated from each other.

As illustrated in FIG. 11, the upper abutting portion 43 is housed in the recess 15a of the front portion 13FR of the rear glass run terminal portion 13. As illustrated in FIG. 12, the abutting plate portion 46a is also housed in the front portion 13FR of the rear glass run terminal portion 13.

As illustrated in FIG. 11, a front end portion of the lower abutting portion 42 in the protruding direction (toward the inside of the cabin) is provided with a guide 42a for guiding the planar sealing member-mount 102d of the upper frame portion 102c between the upper and lower abutting portions 43 and 42. The guide 42a is configured as an inclined surface that is inclined downward toward the inside of the cabin. When the planar sealing member-mount 102d is to be inserted between the upper and lower abutting portions 43 and 42, positioning the planar sealing member-mount 102d relatively below its normal position can ensure that the planar sealing member-mount 102d is guided relatively upward by the guide 42a so as to be inserted between the upper and lower abutting portions 43 and 42. Note that a front end portion of the upper abutting portion 43 in the protruding direction may be provided with a guide 43a for guiding the planar sealing member-mount 102d between the upper and lower abutting portions 43 and 42.

As illustrated in FIG. 12, the extension portion 46 has the abutting plate portion 46a disposed to abut against the planar sealing member-mount 102d from above. The abutting plate portion 46a extends in the front-rear direction along the upper surface of the planar sealing member-mount 102d. The abutting plate portion 46a abutting against the upper surface of the planar sealing member-mount 102d reduces rattling of the fixing member 40.

As illustrated in FIG. 12 and any other figure, the extension portion 46 has an end surface abutting portion 46b that abuts against an end surface of the planar sealing member-mount 102d near the outside of the cabin. The end surface abutting portion 46b is configured as a vertical surface. The end surface abutting portion 46b abutting against the end surface of the planar sealing member-mount 102d near the outside of the cabin allows the fixing member 40 to be positioned in the inside-to-outside direction of the cabin.

Configuration of Garnish 50

Figure 2:
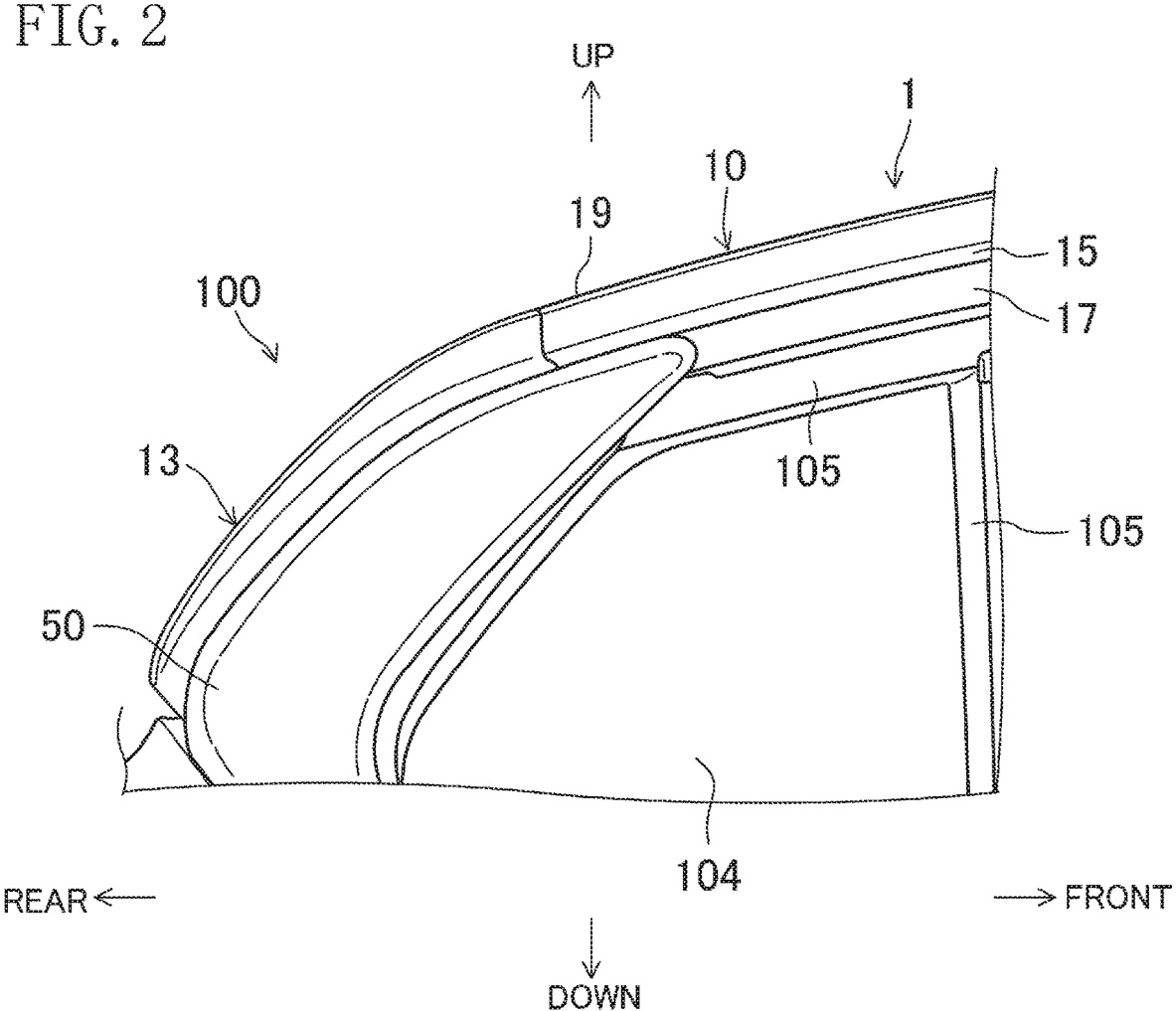
FIG. 2 is an enlarged view of a rear portion of the right automobile door and its surrounding area, as viewed from outside the cabin.

As illustrated in FIGS. 1 and 2, the automobile door 100 includes a garnish 50. The garnish 50 is made of, for example, a hard resin material or any other suitable material, and is mounted to the rear side of the window frame 102. The mounted garnish 50 is configured to be able to cover, and conceal, the rear portion 13RR of the rear glass run terminal portion 13 and the fixing member 40 from the outside of the cabin. A fixing pin (not shown) provided for a portion of the garnish 50 near the inside of the cabin is placed into the opening 41a of the fixing member 40 and the through hole 13c of the rear portion 13RR of the rear glass run terminal portion 13, and is inserted into, and engaged with, the front mounting hole 110c of the upper frame portion 102c.

The plate-shaped body portion 41 that is a rear portion of the fixing member 40 may be fixed to the window frame 102 while being pressed from the outside of the cabin by the garnish 50. Alternatively, the plate-shaped body portion 41 may be fixed to the window frame 102 with a double-sided tape, an adhesive material, or any other suitable material. In these cases, the clip 45 can be omitted. If the fixing member 40 is fixed by the garnish 50, a portion of the fixing member 40 to be pressed by the garnish 50 functions as a fixing target portion. If the fixing member 40 is fixed with, for example, a double-sided tape, an adhesive material, or any other suitable material, a portion of the fixing member 40 to be fixed with the double-sided tape, the adhesive material, or any other suitable material functions as a fixing target portion.

In this embodiment, a procedure in which the molded portion 30 is connected to, and integrated with, the extrusion-molded portion 31, and then the fixing member 40 is mounted to the rear glass run terminal portion 13 has been described. However, the fixing member 40 may be insert-molded just like the structure described in Japanese Patent No. 4079132. For example, the extrusion-molded portion 31 is placed in a molding die (not shown). The engagement portion 44 and extension portion 46 of the fixing member 40 are arranged on the placed extrusion-molded portion 31 at respective desired positions. The resultant object is then placed in a molding die. A molding material is injected into the cavity of the molding die to mold the molded portion 30, which is connected to, and integrated with, the extrusion-molded portion 31. In this case, the clip 45 must be prevented from being covered with the molding material. However, a side surface of the plate-shaped body portion 41 outside the vehicle may be covered with a molding material just like the structure described in Japanese Patent No. 4079132, while a portion of the side surface does not have to be covered.

Advantages of Embodiment

As described above, according to this embodiment, the rear portion 13RR of the rear glass run terminal portion 13 can be fixed to the window frame 102 by the fixing member 40. While the rear portion 13RR is fixed, the engagement portion 44 of the fixing member 40 holds the planar sealing member-mount 102d of the window frame 102 in the thickness direction, and the clip 45 is fixed into the rear mounting hole 110d of the planar portion 110b of the door outer panel 110, which is a portion of the window frame 102 rearward remote from the planar sealing member-mount 102d. That is to say, since portions of the fixing member 40 separated from each other are fixed to the window frame 102, the fixing member 40 is stabilized, and is less likely to rattle. This can reduce separation of the rear portion 13RR of the rear glass run terminal portion 13 from the window frame 102.

The planar sealing member-mount 102d extending toward the outside of the cabin is used to fix the engagement portion 44 of the fixing member 40. Thus, only a small space for the window frame 102 is required to fix the fixing member 40. Even the hiding type glass run 1 can also reduce separation of the rear portion 13RR of the rear glass run terminal portion 13 from the window frame 10

Further, since the extension portion 46 of the fixing member 40 mounted to the glass run 1 extends to the extrusion-molded portion 31, the extension portion 46 is supported by the core material of the extrusion-molded portion 31. As a result, the fixing member 40 becomes more stable.

The embodiment described above is a mere example in every respect, and shall not be interpreted in a limited manner. Furthermore, any modification and change equivalent to the scope of claims fall within the scope of the present disclosure.

As can be seen from the foregoing description, the automobile door sealing member according to the present disclosure can be used for, for example, a door provided for a side portion of an automobile.

What is claimed is:

1. A sealing member for an automobile door, the sealing member being configured to be mounted to a planar sealing member-mount extending toward outside of a cabin from an upper portion of a window frame, and to seal a gap between the window frame and a window glass, the upper portion extending to define a window opening of the automobile door, the sealing member comprising:
   a fixing member being provided on a terminal portion of the sealing member in a front-rear direction of a vehicle, the fixing member being made of a material harder than a molded portion forming part of the terminal portion,
   the fixing member having a body portion, an engagement portion, and a fixing target portion, the body portion being fixed to the terminal portion of the sealing member, the engagement portion being configured to hold the planar sealing member-mount in a thickness direction to engage with the planar sealing member-mount, the fixing target portion being fixed to a portion of the window frame remote from the planar sealing member-mount in the front-rear direction of the vehicle, and
   the engagement portion having an upper abutting portion and a lower abutting portion, the upper abutting portion protruding from the body portion toward inside of the cabin and being configured to abut directly against an upper surface of the planar sealing member-mount from above the planar sealing member-mount, the lower abutting portion protruding from the body portion toward the inside of the cabin and being configured to abut directly against a lower surface of the planar sealing member-mount from below the planar sealing member-mount.

2. The sealing member of claim 1, wherein
   the terminal portion of the sealing member has a molded portion molded by using an openable molding die,
   the molded portion of the terminal portion of the sealing member is connected to an extrusion-molded portion that is extrusion-molded together with a core material, and
   the fixing member has an extension portion extended to, and supported by, the extrusion-molded portion.

3. The sealing member of claim 2, wherein
   the extension portion has an abutting plate portion configured to abut against the planar sealing member-mount from above the planar sealing member-mount.

4. The sealing member of claim 3, wherein
   the extension portion has an end surface abutting portion configured to abut against an end surface of the planar sealing member-mount near outside of the cabin.

5. The sealing member of claim 1, wherein
   a front end portion of at least one of the upper and lower abutting portions in a protruding direction is provided with a guide configured to guide the planar sealing member-mount between the upper and lower abutting portions.

6. The sealing member of claim 1, wherein
the upper abutting portion includes a downwardly facing engagement surface configured to abut directly against the upper surface of the planar sealing member-mount,
the lower abutting portion includes an upwardly facing engagement surface configured to abut directly against the lower surface of the planar sealing member-mount, and
the downwardly facing engagement surface and the upwardly facing engagement surface are axially offset from each other in the front-rear direction along the body portion, and together are configured to hold the planar sealing member-mount in the thickness direction.

* * * * *